US008286881B2

(12) United States Patent
Day

(10) Patent No.: US 8,286,881 B2
(45) Date of Patent: Oct. 16, 2012

(54) SECURE BATTERY COMPARTMENT FOR ALARMING HARD TAG

(75) Inventor: Alan Day, Pembroke Pines, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 308 days.

(21) Appl. No.: 12/760,687

(22) Filed: Apr. 15, 2010

(65) Prior Publication Data

US 2011/0253790 A1 Oct. 20, 2011

(51) Int. Cl.
*G06K 19/00* (2006.01)

(52) U.S. Cl. .......................................................... 235/487

(58) Field of Classification Search .................. 235/383, 235/385, 487; 340/572.1

See application file for complete search history.

(56) References Cited

U.S. PATENT DOCUMENTS

| | | | | |
|---|---|---|---|---|
| 4,774,503 | A * | 9/1988 | Bussard | 340/572.9 |
| 4,851,815 | A | 7/1989 | Enkelmann | |
| 5,099,228 | A | 3/1992 | Israel et al. | |
| 5,428,875 | A | 7/1995 | Nguyen et al. | |
| 6,535,130 | B2 * | 3/2003 | Nguyen et al. | 340/572.9 |
| 6,744,366 | B2 | 6/2004 | How | |
| 7,132,944 | B1 | 11/2006 | Kron et al. | |
| 7,400,254 | B2 * | 7/2008 | Yang et al. | 340/572.1 |
| 7,671,741 | B2 * | 3/2010 | Lax et al. | 340/572.1 |
| 7,737,843 | B2 * | 6/2010 | Belden et al. | 340/568.2 |
| RE41,550 | E * | 8/2010 | Huehner | 70/57.1 |
| 7,961,100 | B2 * | 6/2011 | Wyatt et al. | 340/572.1 |
| 2007/0152836 | A1 | 7/2007 | Nagelski et al. | |
| 2008/0186184 | A1 | 8/2008 | August et al. | |
| 2008/0246613 | A1 | 10/2008 | Lindstrom et al. | |
| 2011/0273295 | A1 * | 11/2011 | Sayegh et al. | 340/572.1 |

FOREIGN PATENT DOCUMENTS

| | | | |
|---|---|---|---|
| DE | 3119112 | A1 | 12/1982 |
| EP | 1593803 | A1 | 11/2005 |
| FR | 2725280 | A1 | 4/1996 |
| WO | 2008/115336 | A1 | 9/2008 |
| WO | 2010/019724 | A1 | 2/2010 |

OTHER PUBLICATIONS

International Search Report and Written Opinion dated Sep. 30, 2011 for International Application Serial No. PCT/US2011/000494, International Filing Date: Mar. 18, 2011, consisting of 14 pages.

* cited by examiner

*Primary Examiner* — Seung Lee

(74) *Attorney, Agent, or Firm* — Alan M. Weisberg; Christopher & Weisberg, P.A.

(57) ABSTRACT

An electronic article surveillance ("EAS") tag for securing an item of merchandise is provided. The EAS tag includes a housing defining an opening leading to a compartment therein. A battery is removably disposed within the compartment. An alarm transducer is electrically connected to the battery. A cover is releasably engageable with the housing to cover the opening. A an anchor is releasably engageable with the housing and adapted to removably affix the housing to the item of merchandise. The anchor overlaps at least a portion of the cover when engaged to the housing to prevent removal of the cover when the anchor is engaged to the housing.

20 Claims, 5 Drawing Sheets

SECURE BATTERY COMPARTMENT FOR ALARMING HARD TAG

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to electronic article surveillance ("EAS") tags and more specifically to a system for securing replaceable power supplies within EAS tags.

BACKGROUND OF THE INVENTION

Electronic article surveillance ("EAS") systems are commonly used in retail stores and other settings to prevent the unauthorized removal of goods from a protected area. Typically, a detection system is configured at an exit from the protected area, which comprises one or more transmitters and antennas ("pedestals") capable of generating an electromagnetic field across the exit, known as the "interrogation zone." Articles to be protected are tagged with an EAS marker that, when active, generates a response signal when passed through this interrogation zone. An antenna and receiver in the same or another "pedestal" detects this response signal and generates an alarm. Certain EAS tags, commonly known as "alarming" tags, include a processor and audible alarm transducer within the actual tag device. Thus, the actual tag "knows" when it has been interrogated by an EAS portal and emits an audible alert when triggered.

Irrespective of the specific type of EAS tag in use, EAS tags often include a power supply, such as a battery, that powers the internal components of the tag for use. Indeed, tags often include a battery or similar power supply that is permanently fixed within the tag itself to prevent shoplifters or other persons from removing or tampering with it. Such removal or tampering would render the tag inoperable, thus defeating it as a security measure. Although in practice, EAS tags are typically removed from an article upon purchase and subsequently stored for reuse on subsequent goods, a tag's ability to be reused may be undesirably limited by the life of the permanently affixed power supply. This limiting characteristic may thus result in the inability to effectively use a tag for a lengthy period of time, instead resulting in discarded tags replaced by ones with fresh power supplies, thereby increasing the overall cost of securing one's goods. For EAS tags including replaceable batteries or similar power supplies prolonging the use of the tags, such batteries may be made easily accessible to retail personnel in order to facilitate rapid and simplistic changing of the batteries. As a consequence though, such accessibility lends itself to unauthorized tampering or removal of the battery and other internal components of the tag by unwanted persons, such as shoplifters. This unwanted accessibility by unauthorized persons can compromise the operation of the tag, thus defeating its effectiveness as a security device.

Therefore, what is needed is an EAS tag having a replaceable power supply whose access is securely limited to desired personnel while remaining inhibitive to tampering or removal by unwanted persons.

SUMMARY OF THE INVENTION

The present invention provides an electronic article surveillance ("EAS") tag for securing an item of merchandise.

In accordance with one aspect, the present invention provides an electronic article surveillance ("EAS") tag for securing an item of merchandise in which the EAS tag has a housing. A removable power supply is positioned within the housing. An anchor is releasably engageable with the housing and is adapted to removably affix the housing to the item of merchandise, engagement of the anchor to the housing obstructing removal of the power supply.

In accordance with another aspect, the present invention provides an electronic article surveillance ("EAS") tag using a power supply for securing an item of merchandise in which the EAS tag has a housing, a cover releasably engageable with the housing and an anchor releasably engageable with the housing. The cover secures the power supply within the housing. The anchor is adapted to removably affix the housing to the item of merchandise. The anchor covers at least a portion of the cover when engaged to the housing.

In accordance with still another aspect, the present invention provides an electronic article surveillance ("EAS") tag for securing an item of merchandise. The EAS tag includes a housing defining an opening leading to a compartment therein. A battery is removably disposed within the compartment. An alarm transducer or sensor is electrically connected to the battery. A cover is releasably engageable with the housing to cover the opening. An anchor is releasably engageable with the housing and adapted to removably affix the housing to the item of merchandise. The anchor overlaps at least a portion of the cover when engaged to the housing to prevent removal of the cover when the anchor is engaged to the housing.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
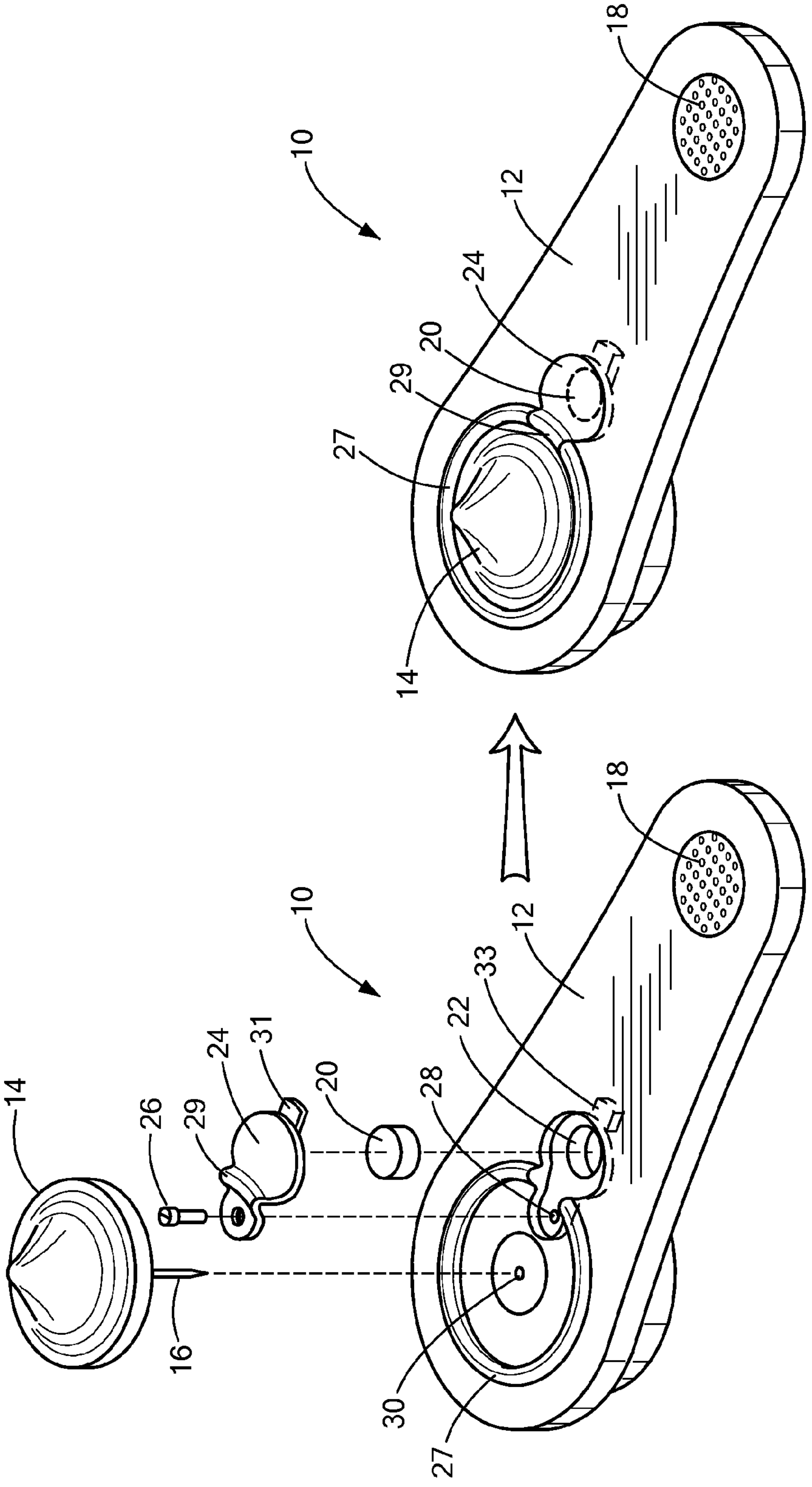
FIG. 1 is an illustration of an exemplary electronic article surveillance ("EAS") tag constructed in accordance with the principles of the present invention.

Before describing in detail exemplary embodiments that are in accordance with the present invention, it is noted that the embodiments reside primarily in combinations of apparatus components and processing steps related to electronic article surveillance ("EAS") tags having a replaceable power supply whose access is securely limited to desired personnel while remaining inhibitive to tampering or removal by unwanted persons.

Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Moreover, while certain embodiments disclosed herein may illustrate features not expressly indicated on alternative embodiments, it is understood that the features and components of the EAS tags disclosed herein may be included in a variety of different combinations or configurations without departing from the scope and spirit of the invention.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides EAS tags having a replaceable power supply whose access is limited to desired personnel while preventing tampering or removal of the tag's power supply by unwanted persons. Referring now to the drawing figures in which like reference designators refer to like elements, there is shown in FIG. 1 one configuration of an exemplary EAS tag 10 constructed in accordance with the principles of the present invention. The EAS tag 10 generally defines a body or housing 12 that can be securely attached to an article of merchandise for electronic monitoring thereof. An anchor 14 that is selectively engageable and releasable from the housing facilitates attachment or affixation of the EAS tag housing 12 to a desired good. For example, the anchor 14 may include a tack or pin 16 extending there from that can pierce a portion of the secured good. The housing 12 may receive a portion of the tack 16 protruding from the article, at which point the anchor 14 becomes securely engaged with the housing 12 through mechanical, magnetic, and/or electrical mechanisms as known in the art. The subsequent, selective removal or disengagement of the anchor 14 from the housing 12 may be limited to desired personnel having specialized tools or modalities for such disengagement, as also known in the art.

The EAS tag 10 may generally contain or otherwise include the components rendering the EAS tag operative for securing such articles or merchandise. Such components (not shown) may include, for example, an antenna, a microprocessor or RFID logic block, an alarming tag processor, an EAS sensor, a tampering sensor or the like. The RFID logic block may implement the behavior of a standard RFID tag, including the standard functionality currently found in passive RFID tags and/or active alarming tags, including ID numbering, data areas, encoding according to industry or customer standards, RFID tracking and inventory operations.

The EAS tag 10 may further include an alarm transducer 18 coupled to or otherwise at least partially disposed within the housing 12. The alarm transducer 18, such as a speaker and/or light-emitting diode ("LED"), may be electrically coupled to one or more of the above-named components and emit an audible and/or visual alert when an alarm is triggered.

The EAS tag 10 may further include a replaceable power supply, such as one or more batteries 20, coupled to or otherwise disposed within the housing 12 to electrically power the operating components of the tag 10, including the alarm transducer and processor (not shown), for example. In particular, the tag 10 may include one or more batteries 20 positionable within, on, or about the housing 12. Moreover, the one or more batteries 20 may be secured in, on or about the housing 12 at least in part by the anchor 14. That is, engagement of the anchor 14 to the housing 12 may obstruct access to and/or removal of the power supply.

For example, continuing to refer to FIG. 1, the housing 12 may define a compartment, depression, or region 22 for receiving the battery. The tag 10 may include a cover 24 removably attachable to the housing 12 that is positionable over the compartment, depression, or battery-receiving region 22. While attachment and removal of the cover 24 facilitates insertion and removal of the battery 20, attachment of the anchor 14 to the housing 12 may restrict removal of the cover 24 (and thus the battery 20). For example, as shown in FIG. 1, the cover 24 attaches to the housing by the use of a fastener 26, such as a screw. The fastener 26 matably couples to a threaded aperture 28 or the like included on the housing 12. The attachment point of the cover's fastener may be positioned at a region of the housing 12 that is obscured by the anchor 14 when the anchor 14 is attached to the housing 12. In particular, the anchor 14 overlaps at least a portion of the cover 24 to prevent removal of the cover 24 (and the battery) when the anchor 14 is engaged to the housing 12, as shown in the assembled portion of FIG. 1.

The housing 12 may further define a raised lip, ridge or ring 27 that circumscribes or otherwise surrounds a perimeter of the anchor 14 when the anchor 14 is coupled to the housing 12. The cover 24 may also include a raised feature or lip 29 that aligns with or otherwise completes the lip 27 of the housing when the cover 24 is coupled to the housing 12. The respective raised features or lips 27, 29 of the housing 12 and cover 24 protect against or otherwise frustrate the insertion of tools or objects between the anchor 14 and the housing 12 to forcibly pry the anchor 14 away from the housing 12.

Figure 2:
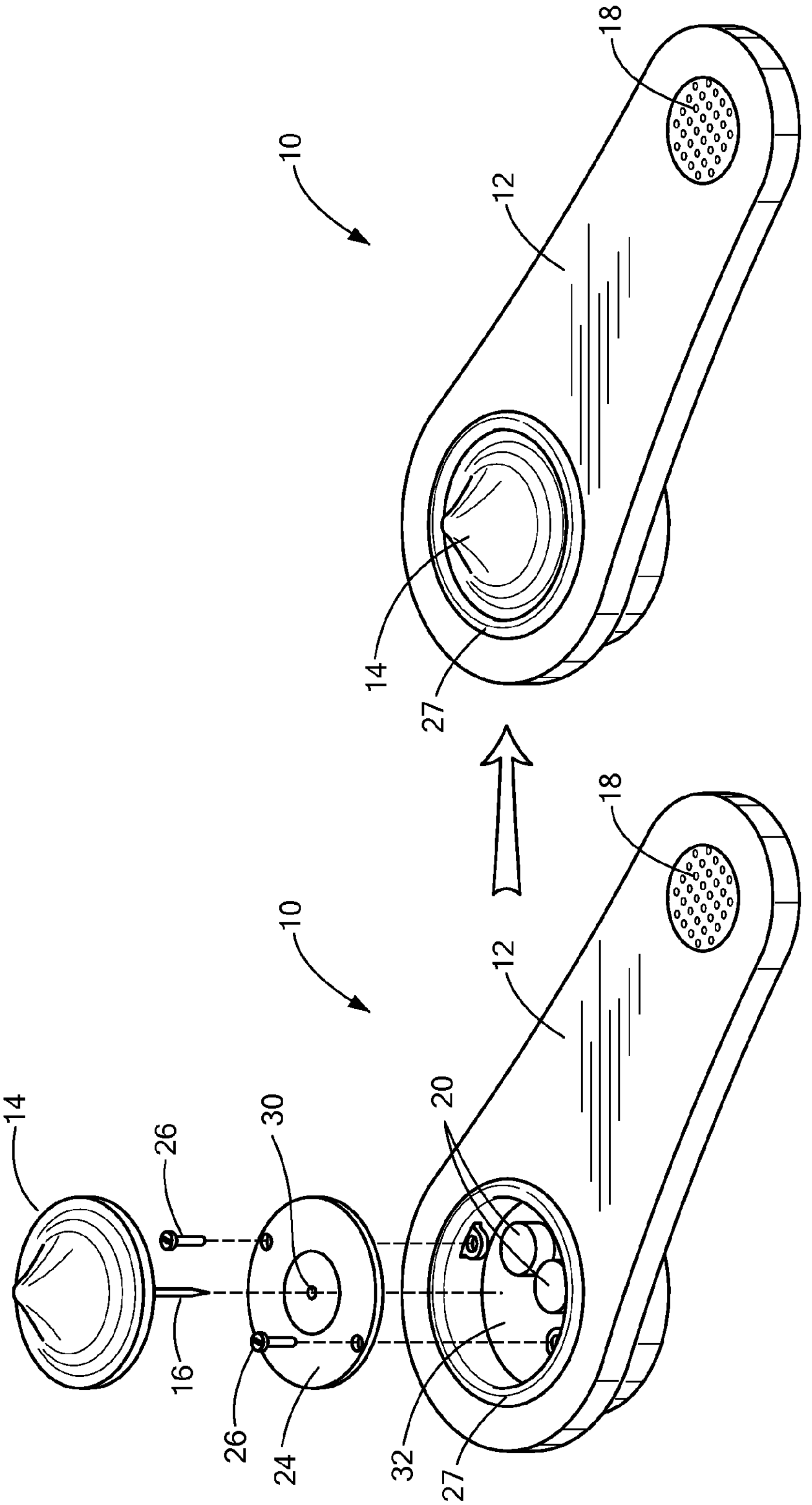
FIG. 2 is an illustration of another exemplary EAS tag constructed in accordance with the principles of the present invention.

As shown in FIG. 1, the cover 24 may be attached to the housing by one or more fasteners 26, including one or more screw, clips, or the like. The cover 24 may further define a flange 31 extending from a side opposite where the fasteners attach, where the flange 31 is positionable within a recession 33 defined by the housing. The recession 33 may be defined by a cavity or other space under a protruding portion of the housing to receive the flange 31 therein. As an additional example, FIG. 2 illustrates the elongated housing 12 defining a region 32 therein for placement of a battery 20. In this example, the cover 24 is attachable to the housing 12 by two fasteners 26 oppositely positioned from one another about the battery-receiving region 22 of the housing 12. The cover 24 defines an aperture 30 therein for receiving a portion of the anchor 14, which is again releasably engageable with the housing 12 to secure the tag 10 to an article of clothing or the like for surveillance. Engaging the anchor 14 to the housing 12 obstructs removal of the cover 24 (and thus access to the battery 20) by overlapping and concealing the attachment points (i.e., location of the fasteners/screws) where the cover 24 connects to the housing 12.

Figure 3:
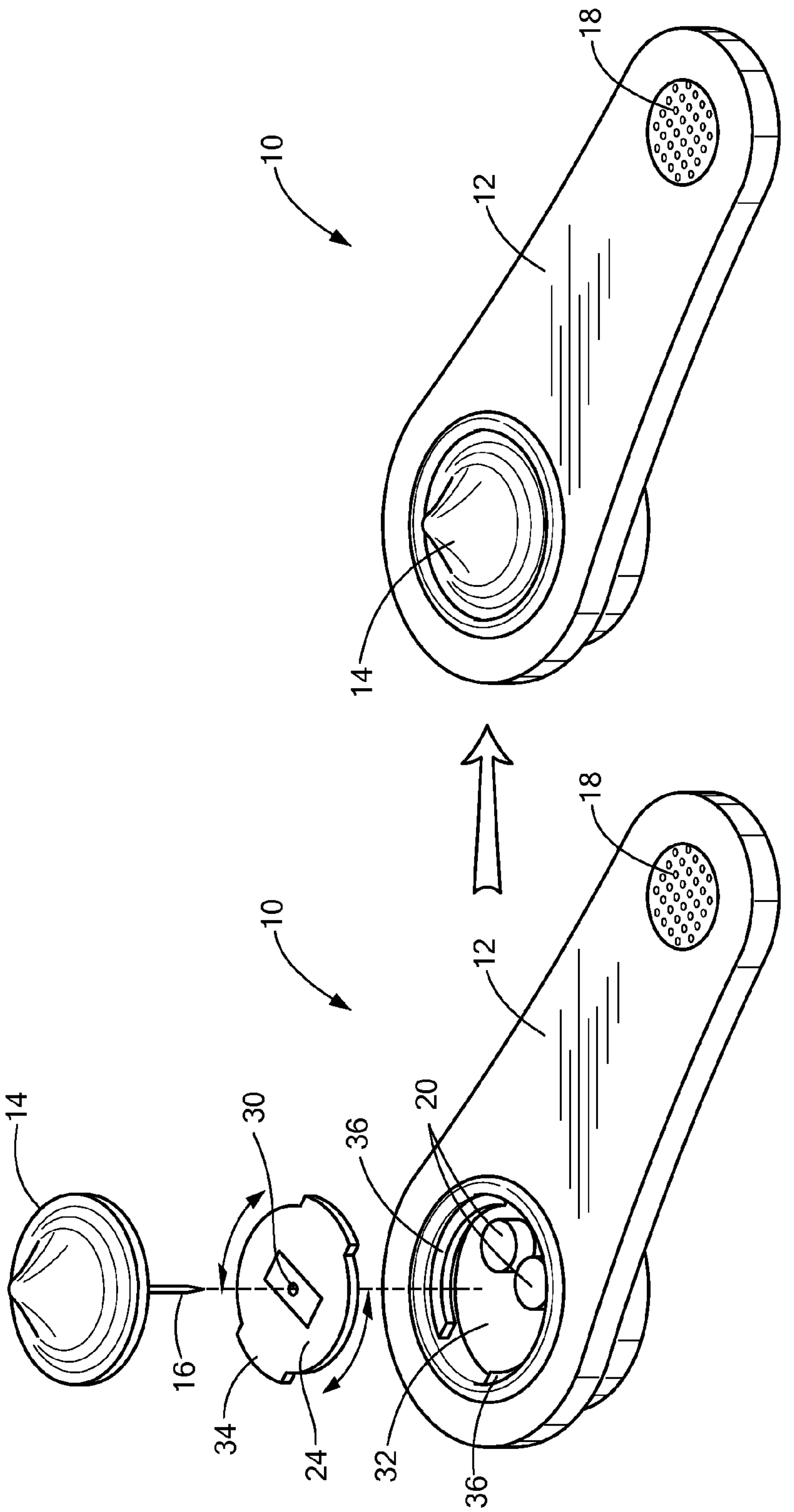
FIG. 3 is an illustration of yet another exemplary EAS tag constructed in accordance with the principles of the present invention.

Alternatively, the cover 24 may be engageable with the housing 12 through a slot-tab relationship or other releasable engagement mechanisms. Now referring to FIG. 3, the EAS tag housing 12 is again illustrated defining an opening 32 connecting to or otherwise providing access to a battery-receiving compartment therein. In this example, the cover 24 is releasably attachable to the housing 12 by a rotatable, quarter-turn tab configuration. That is, the cover 24 includes one or more tabs 34 that can be rotatably positioned with respect to one or more complimentary tabs 36 on the housing 12 to secure the cover 24 in place. The cover 24 again defines an aperture 30 therein for receiving a portion of the anchor 14, such as the tack 16. Engaging the anchor 14 to the housing 10 prevents access to the cover 24, thereby preventing the cover 24 from being rotatably disengaged from the housing 12. Because the cover 24 is inaccessible, so too are the batteries 20 lying underneath the cover 24 when the anchor 14 is attached to the cover 24 and the housing 12.

Figure 4:
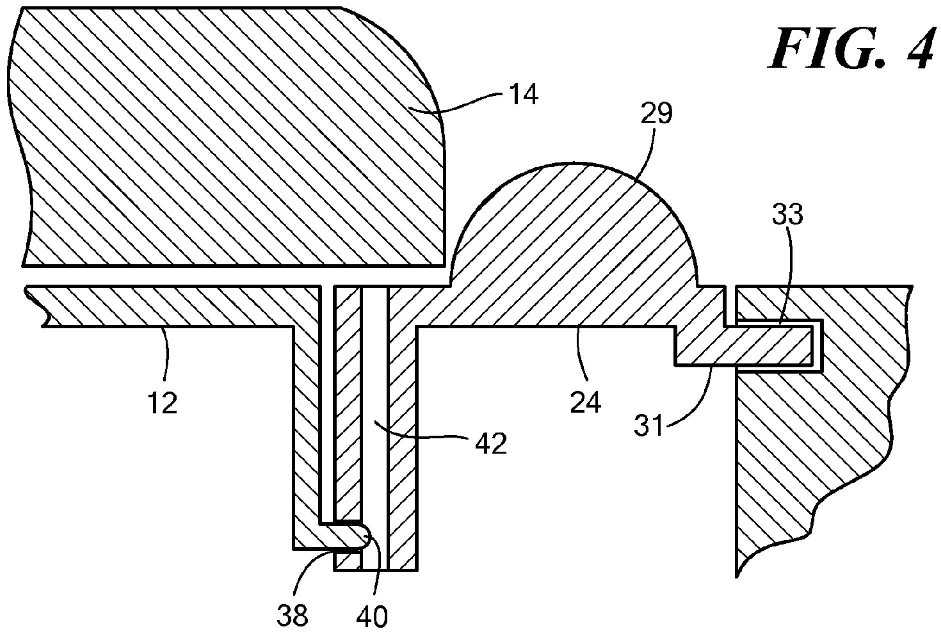
FIG. 4 is a cross-sectional illustration of an exemplary mechanical engagement mechanism for components of an EAS tag constructed in accordance with the principles of the present invention.

FIG. 4 illustrates a view of an additional complimentary, releasable engagement mechanism between the housing 12 of the EAS tag 10 and the cover 24 that conceals or otherwise closes an interior portion of the tag 10. The embodiment shown in FIG. 1 can be readily implemented using the cover 24 attachment arrangement shown in FIG. 4. As such, only the salient aspects pertaining to the releasable slot/flange cover mechanism are shown and described with reference to FIG. 4. In particular, the cover 24 defines a slot 38 subjacent to an exterior surface of the cover 24, where the slot 38 receives a portion of a tab 40 on a segment of the housing 10. The slot 38 may be defined on a portion of the cover 24 opposite the flange 31, which is positionable within the recess 33 to at least partially secure the cover 24 in place, as described above. The tab 40 may engage the slot 38 of the cover 24 upon positioning of the cover 24 across an opening in the housing 12 to further secure the cover 24 in place. The cover 24 may further define a passage 42 extending downward towards the slot 38. This passage 42 allows the slot-tab engagement to be released upon insertion of an elongate tool (not shown) that can displace the tab 40 from the slot 38, resulting in the eased removal of the cover 24 from the housing 12. Moreover, the anchor 14 may be coupled to the housing 12 to obscure or otherwise block access to the passage 42, thereby inhibiting the removal of the cover 24 and the batteries underneath.

Figure 5:
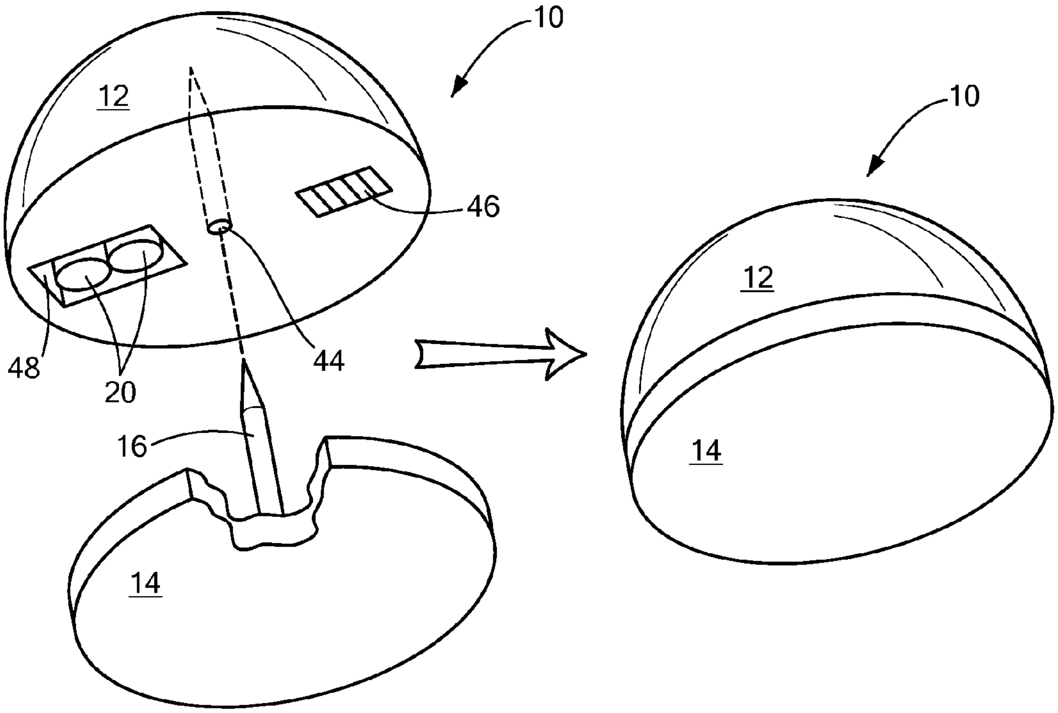
FIG. 5 is an illustration of still another exemplary EAS tag constructed in accordance with the principles of the present invention.

Now referring to FIG. 5, an additional configuration of the EAS tag 10 is shown. Similar to the tag of FIG. 1, the housing 12 releasably engages the anchor 14 to facilitate attachment of the tag 10 to one or more goods or merchandise. As shown, the housing 12 of the EAS tag 10 includes a hemispherical shape having a substantially planar face and a passage 44 for receipt of a portion of the anchor 14. The EAS tag 10 may further include a power source indicator 46 that visually represents a voltage measurement, current measurement, remaining charge indication, or other information representative of the operation or performance of the power supply/batteries 20 in the tag 10. The power source indicator 46 may be located on the housing 12 such that it is hidden from view when the anchor 14 is attached to the housing 12 to prevent unauthorized or undesired persons from knowing whether or not a power supply 20 of the tag, and thus the tag itself, is functioning properly.

An opening 48 on the planar face provides access to an interior compartment within the housing 12 where one or more batteries 20 reside. Rather than including a separate cover to enclose or otherwise seal off the compartment containing the replaceable power source, the anchor 14 itself may provide the desired obstruction to access and removal of the batteries 20. In particular, when the anchor 14 is secured to the housing 12, the anchor 14 extends across the opening 48 of the housing 10 to obscure the compartment and the batteries inside. As a result, access to the batteries 20 is prevented by the secure engagement of the anchor 14 to the housing 12.

Figure 6:
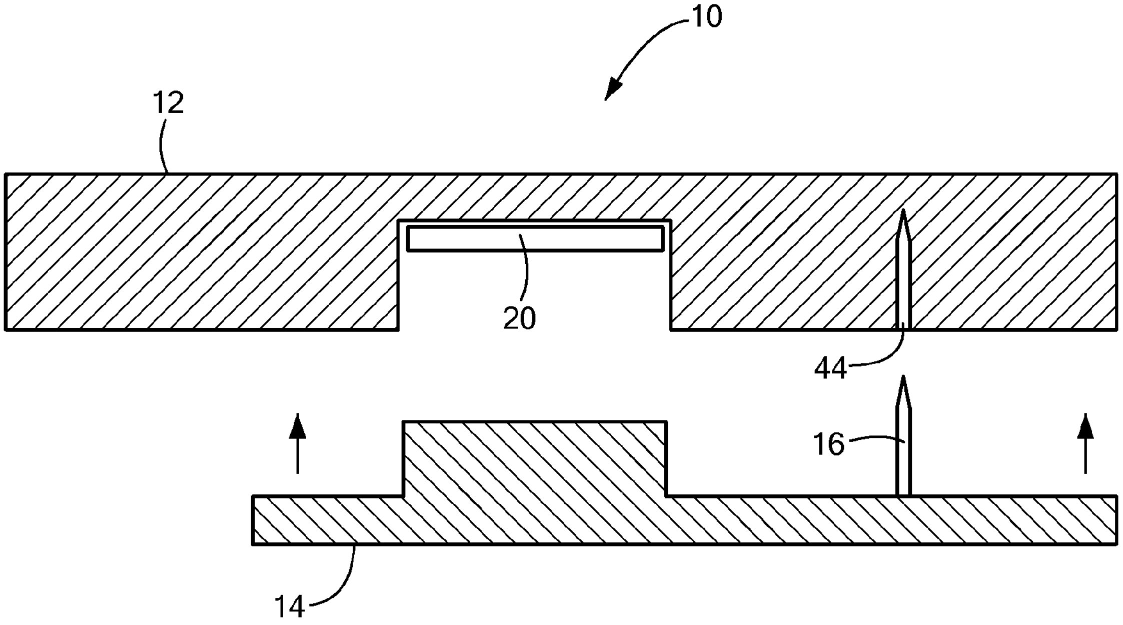
FIG. 6 is a cross-sectional illustration of an exemplary EAS tag constructed in accordance with the principles of the present invention.

FIG. 6 illustrates an additional configuration where the anchor 14 itself may be used to secure one or more batteries 20 inside the tag housing 12. In particular, the housing 12 of the EAS tag 10 shown in FIG. 6 defines a compartment therein for receiving a replaceable power supply, such as a battery 20. The housing 12 further defines a passage 44 for releasably receiving a portion of the anchor 14, similar to that of FIGS. 1-5 as described above. In the illustrated configuration, the anchor 14 covers the compartment for the battery 20, rendering it inaccessible when the anchor 14 is engaged to the housing 12 and in use to monitor the selected goods that the tag 10 is attached to.

Figure 7:
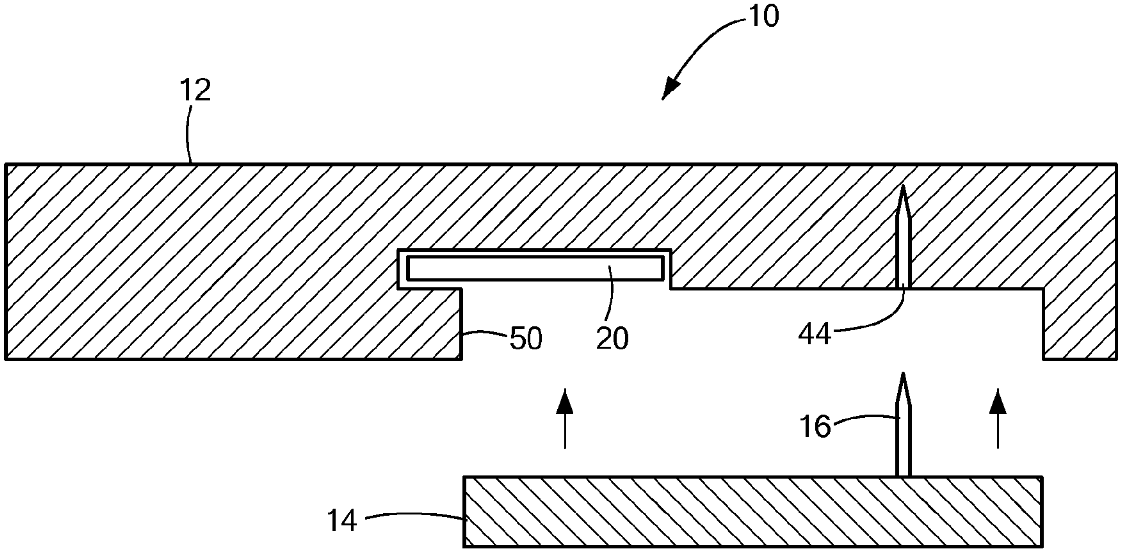
FIG. 7 is a cross-sectional illustration of another exemplary EAS tag constructed in accordance with the principles of the present invention.

FIG. 7 illustrates still another configuration where the anchor 14 itself may be used to secure one or more batteries 20 inside the tag housing 12. In particular, the housing 12 of the EAS tag 10 defines a recess or compartment therein for receiving a replaceable power supply, such as a battery 20. The housing 12 further defines a protruding collar 50 that at least partially overlaps the battery 20 lying there under to aid in securing the battery in place. The passage 44 for releasably receiving a portion of the anchor 14, similar to that of shown in FIGS. 1-5 and described above, is also shown. In the illustrated configuration, the anchor 14 engages the housing 12 adjacent the extending collar 50 to cover the battery to again prevent tampering, access, or removal of the battery when the anchor is engaged to the housing and in use. Of note, while the replaceable power supplies and batteries illustrated in the figures described above have a substantially coplanar arrangement with respect to a longitudinal alignment of the housing 12 and cover 24, this is merely an example, and it is contemplated that the power supplies and batteries may be placed or aligned in a transverse orientation with respect to the housing.

The configurations described above beneficially provide an EAS tag having a replaceable power supply whose access is securely limited to desired personnel while remaining inhibitive to tampering or removal by unwanted persons. By limiting removal or tampering the replaceable power source when the tag is attached to an article of clothing or other goods, the tag's operation can be securely ensured while still allowing for the replacement of depleted power supplies by authorized personnel to extend the life and reusability of the tag virtually indefinitely. The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An electronic article surveillance ("EAS") tag for securing an item of merchandise, the EAS tag comprising:

a housing;

a removable power supply positioned within the housing; and an anchor releasably engageable with the housing and adapted to removably affix the housing to the item of merchandise, engagement of the anchor to the housing obstructing removal of the power supply.

2. The EAS tag of claim 1, wherein the removable power supply includes at least one battery.

3. The EAS tag of claim 1, further comprising a power level indicator electrically coupled to the power supply.

4. The EAS tag of claim 3, wherein the power level indicator is located on the housing, and wherein the anchor is engageable to the housing to obscure the power level indicator.

5. The EAS tag of claim 1, wherein the housing defines an opening providing access to the power supply, and the anchor covers the opening upon engagement to the housing.

6. The EAS tag of claim 1, wherein the housing defines an opening to a compartment therein containing the power supply, the EAS tag further comprising a cover attachable to the housing over the opening.

7. The EAS tag of claim 6, wherein the anchor overlaps at least a portion of the cover when engaged to the housing.

8. The EAS tag of claim 6, wherein the cover is affixed to the housing by at least one screw.

9. The EAS tag of claim 6, wherein the cover defines a slot releasably engageable with a tab defined by the housing.

10. The EAS tag of claim 6, wherein the housing and cover define a lip that substantially circumscribes the anchor when the anchor is engaged with the housing.

11. An electronic article surveillance ("EAS") tag using a removable power supply for securing an item of merchandise, the EAS tag comprising:

a housing;

a cover releasably engageable with the housing, the cover providing access to the removable power supply, the cover securing the removable power supply within the housing; and an anchor releasably engageable with the housing and adapted to removably affix the housing to the item of merchandise, the anchor covering at least a portion of the cover when engaged to the housing.

12. The EAS tag of claim 11, wherein the cover is releasably engageable with the housing by one or more screws.

13. The EAS tag of claim 11, wherein the cover is releasably engageable with the housing by a quarter-turn mechanism.

14. The EAS tag of claim 11, wherein the cover defines a flange positionable within a recession defined by the housing.

15. The EAS tag of claim 11, further comprising an alarm transducer powered by the removable power supply.

16. The EAS tag of claim 11, further comprising a power level indicator electrically coupled to the removable power supply.

17. The EAS tag of claim 11, wherein the housing defines a raised lip and the cover defines a raised lip positionable adjacent to the lip of the housing.

18. An electronic article surveillance ("EAS") tag for securing an item of merchandise, the EAS tag comprising:

a housing defining an opening leading to a compartment therein;

a battery removably disposed within the compartment;

at least one of an alarm transducer and sensor powered by the battery;

a cover releasably engageable with the housing to cover the opening; and an anchor releasably engageable with the housing and adapted to removably affix the housing to the item of merchandise, the anchor overlapping at least a portion of the cover when engaged to the housing to prevent removal of the cover when the anchor is engaged to the housing.

19. The EAS tag of claim 18, further comprising a battery power level indicator disposed on the housing and electrically coupled to the battery, the battery power level indicator being obscured by the anchor when the anchor is affixed to the housing.

20. The EAS tag of claim 18, wherein the housing comprises a first lip and the cover defines a second lip, the first lip and the second lip substantially circumscribe the anchor when the anchor is engaged with the housing.

* * * * *